US011368046B2

(12) United States Patent
Panfil et al.

(10) Patent No.: US 11,368,046 B2
(45) Date of Patent: Jun. 21, 2022

(54) POWER SUPPLY MANAGEMENT SYSTEM AND METHOD FOR USE WITH ONE OR MULTIPLE DIFFERENT UTILITY PROXIES

(71) Applicant: Vertiv Corporation, Columbus, OH (US)

(72) Inventors: Peter A. Panfil, Columbus, OH (US); Graziano Galuppi, Imola (IT); Robert C. Pfleging, O'Fallon, MO (US); Steven M. Madara, Dublin, OH (US)

(73) Assignee: Vertiv Corporation, Columbus, OH (US)

( * ) Notice: Subject to any disclaimer, the term of this patent is extended or adjusted under 35 U.S.C. 154(b) by 0 days.

(21) Appl. No.: 17/171,555

(22) Filed: Feb. 9, 2021

(65) Prior Publication Data

US 2021/0249894 A1  Aug. 12, 2021

Related U.S. Application Data

(60) Provisional application No. 63/009,096, filed on Apr. 13, 2020, provisional application No. 62/972,521, filed on Feb. 10, 2020.

(51) Int. Cl.
*H02J 9/06* (2006.01)
*H02J 7/00* (2006.01)
(Continued)

(52) U.S. Cl.
CPC .............. *H02J 9/06* (2013.01); *G05B 13/021* (2013.01); *H02J 3/32* (2013.01); *H02J 7/0068* (2013.01); *H02J 13/00002* (2020.01)

(58) Field of Classification Search
CPC .......... H02J 9/06; H02J 13/00002; H02J 3/32; H02J 7/0068; G05B 13/021
See application file for complete search history.

(56) References Cited

U.S. PATENT DOCUMENTS 10,432,017 B1 * 10/2019 Morales ................. H02J 9/061
10,432,082 B1   10/2019 Sharifipour et al.
(Continued)

FOREIGN PATENT DOCUMENTS

EP     2793345 A1   10/2014

OTHER PUBLICATIONS

International Search Report and Written Opinion regarding International Application No. PCT/US2021/017376, dated Apr. 23, 2021.

*Primary Examiner* — Michael R. Fin
(74) *Attorney, Agent, or Firm* — Harness, Dickey & Pierce, P.L.C.

(57) ABSTRACT

The present disclosure relates to a power supply management system adapted for use with at least one utility proxy power source, to help control powering a load when an AC mains power source is not available to provide power to the load. The system has a power converter forming an uninterruptible power supply, and includes a controller configured to control operation of the power converter. A supplemental battery subsystem is included which is in communication with the power converter for supplying DC power to the power converter. The controller monitors the application of power from the utility proxy to the load and uses the DC power supplied by the supplemental battery subsystem, when needed, to supplement the generation of power by the power converter, to thus assist the power converter in powering the load along with the power being provided by the utility proxy.

20 Claims, 7 Drawing Sheets

(51) Int. Cl.
*G05B 13/02* (2006.01)
*H02J 13/00* (2006.01)
*H02J 3/32* (2006.01)

(56) References Cited

U.S. PATENT DOCUMENTS

| | | |
|---|---|---|
| 2006/0192435 A1 | 8/2006 | Parmley |
| 2006/0226706 A1 | 10/2006 | Edelen et al. |
| 2007/0210652 A1* | 9/2007 | Tracy .................. H02J 9/062 307/66 |
| 2008/0067872 A1* | 3/2008 | Moth .................. H02J 9/062 307/23 |
| 2010/0194341 A1* | 8/2010 | Anupindi ............ H01M 10/482 320/118 |
| 2011/0187197 A1* | 8/2011 | Moth .................. H02J 9/062 307/66 |
| 2011/0283119 A1 | 11/2011 | Szu et al. |
| 2012/0068541 A1* | 3/2012 | Anderson ............ H02J 9/061 307/66 |
| 2014/0379160 A1 | 12/2014 | Fallon |
| 2016/0036070 A1* | 2/2016 | Peterson ........... H01M 8/04723 429/429 |
| 2016/0197517 A1* | 7/2016 | Bundschuh ............ H02J 3/381 307/64 |
| 2016/0329713 A1* | 11/2016 | Berard .................. H02J 3/383 |
| 2017/0012429 A1* | 1/2017 | Nanda .................. H02J 3/382 |
| 2019/0067989 A1 | 2/2019 | Beg |

\* cited by examiner

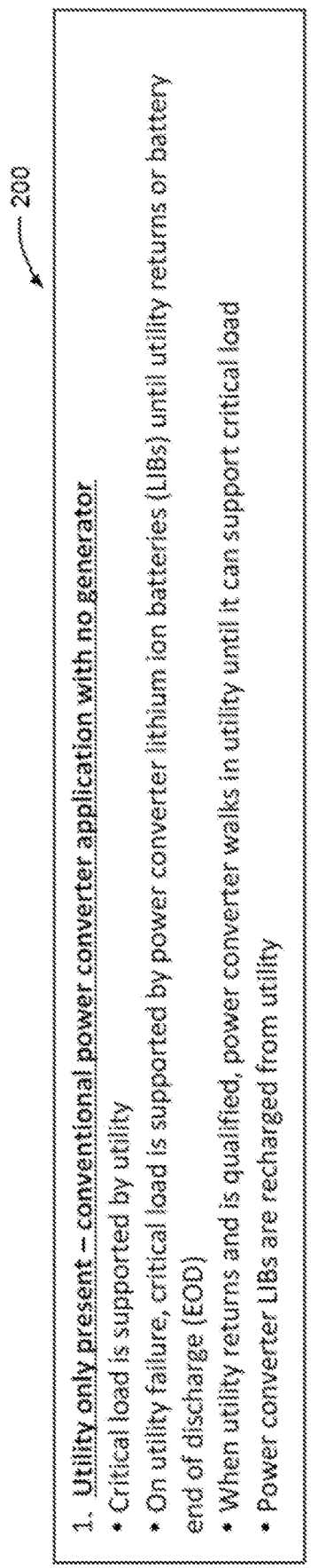

1. Utility only present – conventional power converter application with no generator
- Critical load is supported by utility
- On utility failure, critical load is supported by power converter lithium ion batteries (LIBs) until utility returns or battery end of discharge (EOD)
- When utility returns and is qualified, power converter walks in utility until it can support critical load
- Power converter LIBs are recharged from utility

FIGURE 3

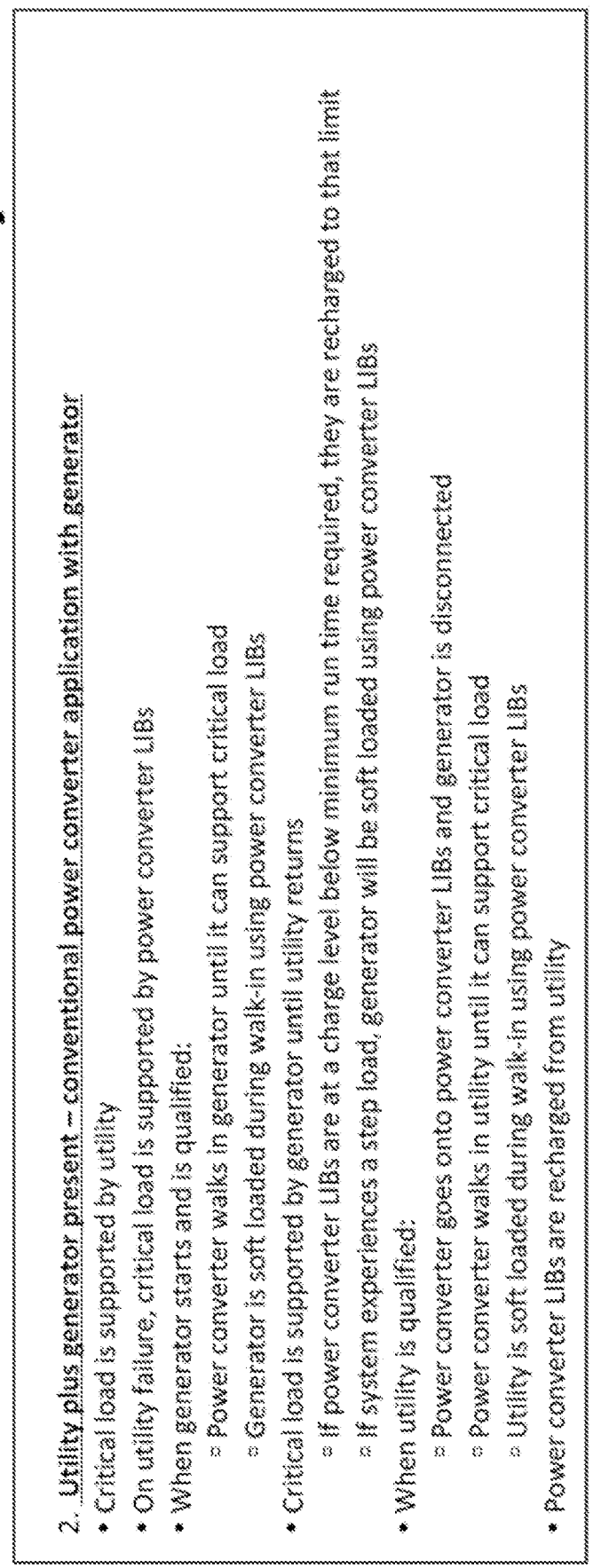

2. Utility plus generator present – conventional power converter application with generator
- Critical load is supported by utility
- On utility failure, critical load is supported by power converter LIBs
- When generator starts and is qualified:
  - Power converter walks in generator until it can support critical load
  - Generator is soft loaded during walk-in using power converter LIBs
- Critical load is supported by generator until utility returns
  - If power converter LIBs are at a charge level below minimum run time required, they are recharged to that limit
  - If system experiences a step load, generator will be soft loaded using power converter LIBs
- When utility is qualified:
  - Power converter goes onto power converter LIBs and generator is disconnected
  - Power converter walks in utility until it can support critical load
  - Utility is soft loaded during walk-in using power converter LIBs
- Power converter LIBs are recharged from utility

FIGURE 4

3. Utility plus extended run LIB, no generator
   - Critical load is supported by utility
   - On utility failure, critical load is supported by power converter LIBs
   - Islanding logic isolates utility
   - Power converter draws energy from power converter LIBs in source-share mode until extended run LIB comes up to capacity
   - Critical load is supported by extended run LIB until utility returns
     - Extended run LIB is soft loaded during walk-in using power converter LIBs
     - If power converter LIBs are at charge level below minimum run time required, they are recharged to that limit
     - If system experiences step load, extended run LIB will be soft loaded using power converter LIBs
   - When utility is qualified:
     - Power converter goes onto power converter LIBs and extended run LIB changes from source to recharge mode
     - Power converter walks in utility until it can support critical load
   - Power converter LIBs and extended run LIB are recharged from utility
     - If fuel cell is present, extended run LIB may be held in partial recharge state so they can be used to absorb any additional power generated by fuel cell that is not required by critical load

FIGURE 5

POWER SUPPLY MANAGEMENT SYSTEM AND METHOD FOR USE WITH ONE OR MULTIPLE DIFFERENT UTILITY PROXIES

CROSS-REFERENCE TO RELATED APPLICATIONS

This application claims the benefit of U.S. Provisional Application No. 63/009,096, filed Apr. 13, 2020, and U.S. Provisional Application No. 62/972,521, filed Feb. 10, 2020. The entire disclosure of each of the above applications is incorporated herein by reference.

FIELD

The present disclosure relates to power supply management systems and methods, and more particularly to a power supply management system and method which makes use of a supplemental battery power source to overcome the response limitations when using various types of utility proxies such as fuel cells and integrated battery packs, which are not sufficiently fast in their response times to meet real time changes in load requirements.

BACKGROUND

The statements in this section merely provide background information related to the present disclosure and may not constitute prior art.

In many applications, particularly such as data centers, hospitals, financial institutions, etc., there is a need for reliable electrical power to power various computer related equipment and other types of electronic equipment. To this end, such environments often may implement two or more sources of backup power in the event AC mains power is lost.

Interest in the use of both fuel cells and integrated battery power subsystems are gaining in popularity as utility proxies in critical applications. However, fuel cells in particular have traditionally suffered from significant limitations that have limited their applicability as a utility proxy. One particularly significant limitation is the inability of a traditional fuel cell, such as a solid oxide fuel cell, to respond sufficiently fast in real time to meet the needs of a load when called on to do so. Fuel cells are known to have a general "spongy" response when loaded, meaning that they are generally not able to respond virtually instantaneously to increases or decreases in the load. To a lesser extent, this limitation may also be experienced when using an integrated battery power subsystem (which provides an AC output) as a utility proxy. Still further, this "sponginess" in response is also typically present with both diesel and natural gas powered generators, but to a lesser extent than with fuel cells.

Another drawback with fuel cells is that their power output is more difficult to closely regulate, which can result in time periods where the fuel cell is producing more power than is needed by the critical load. In that instance the excess power must be channeled to a supplemental load, which amounts to wasted energy.

Accordingly, there is a need for systems and methods that make better and more efficient use of both fuel cells and integrated battery power subsystems as utility proxies for powering critical loads, and which overcome the above-described, well-known drawbacks associated with these types of utility proxies.

SUMMARY

This section provides a general summary of the disclosure, and is not a comprehensive disclosure of its full scope or all of its features.

In one aspect the present disclosure relates to a power supply management system adapted for use with at least one utility proxy power source, to help control powering a load when an AC mains power source is not available to provide power to the load. The system comprise a power converter forming an uninterruptible power supply, with the power converter including a controller configured to control operation of the power converter. A supplemental battery subsystem is included which is in communication with the power converter for supplying DC power to the power converter. The controller is further configured to monitor the application of power from the utility proxy to the load and to use the DC power supplied by the supplemental battery subsystem, when needed, to supplement the generation of power by the power converter, to thus assist in powering the load along with the power being provided by the utility proxy.

In another aspect the present disclosure relates to a power supply management system adapted for use with a plurality of available utility proxies, wherein the plurality of utility proxies includes a fuel cell utility proxy, to help control powering a load when an AC mains power source is not available to provide power to the load. The system may comprise a power converter forming an uninterruptible power supply. The power converter includes an internal power converter controller configured to control operation of the power converter. A supplemental battery subsystem is in communication with the power converter for supplying DC power to the power converter. The power converter controller is further configured to monitor the application of power from the utility proxy to the load and to use the DC power supplied by the supplemental battery subsystem, when needed, to supplement the generation of power by the power converter, to thus assist in powering the load along with the power being provided by the utility proxy. The power converter controller is further configured to monitor for step changes in load when the load is being supported by the fuel cell utility proxy, and to use the supplemental battery subsystem to provide power to the load when a step increase in demand from the load is detected; and when a step decrease in demand from the load is detected, to use excess power to charge the supplemental battery subsystem.

In still another aspect the present disclosure relates to a power supply management method for use with at least one utility proxy power source, to help control an application of power to a load when an AC mains power source is not available to provide power to the load. The method may comprise using a power converter forming an uninterruptible power supply to assist in providing power from the at least one utility proxy to the load. The method may further include using a supplemental battery subsystem in communication with the power converter to supply DC power to the power converter. Still further, the method may include controlling the power converter to use the DC power provided from the supplemental battery subsystem, when needed, to supplement the generation of power by the power converter, to thus assist the utility proxy in powering the load.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 3 is a table listing operations for a power converter operating in a conventional uninterruptible power supply (UPS) application with no generator available, when power from a utility is lost;

FIG. 4 is a table listing operations for a power converter that has an available generator;

FIG. 5 is a table listing operations for a power converter that has available an integrated battery storage subsystem employing an extended run lithium ion battery pack ("extended run LIB"), but no generator, for assisting with conditions where power from a utility is lost;

DETAILED DESCRIPTION

Example embodiments will now be described more fully with reference to the accompanying drawings.

Figure 1:
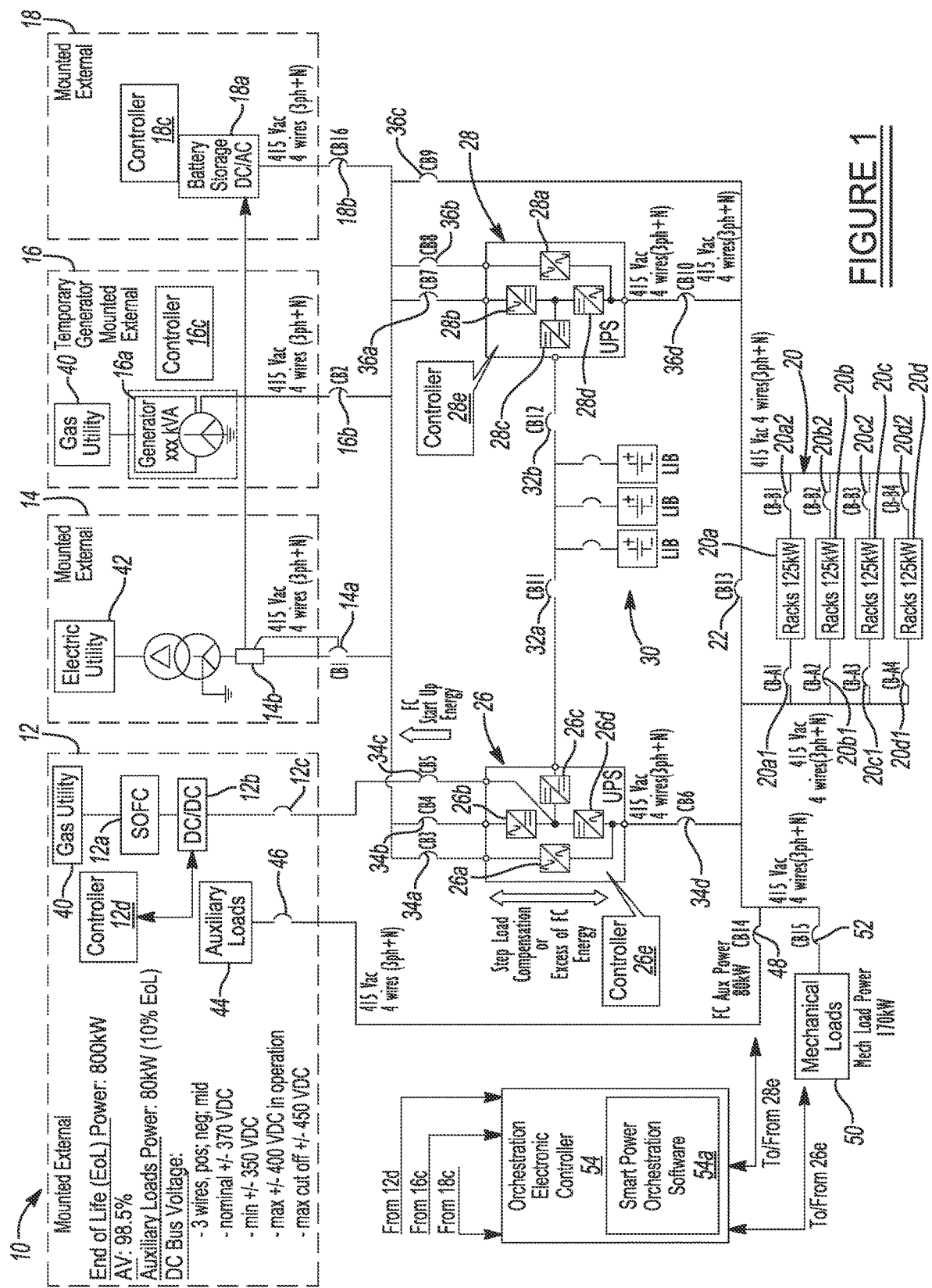
FIG. 1 is a high level schematic diagram of one embodiment of a system in accordance with the present disclosure.

Referring to FIG. 1, one embodiment of a power supply/management system 10 is shown in accordance with the present disclosure. The system 10 in this example makes use of four distinct power supply sources: a fuel cell subsystem 12, an electric utility power source 14 (i.e., AC mains power source), an external generator subsystem 16 (either diesel powered or natural gas powered), and an integrated battery power subsystem 18. The power supply sources 12, 14, 16 or 18 may be used, in any hierarchical order, to power a load 20. The power supply sources 12, 16 and 18 in this example form utility "proxies", meaning they act as a substitute for the electric utility power source 14 when the utility power source 14 is not available. It will be appreciated that other utility proxies, for example, back-up systems to the power supply sources 12, 16 or 18, may be incorporated into the system 10. And while a fuel cell subsystem, an external generator subsystem and an integrated battery power subsystem have been illustrated as substitute power sources, it will be appreciated that the system 10 is not limited to use with only these types of alternative power sources. Virtually any other form of alternative power source may be incorporated into the system 10 with little or no modification to the system.

The load 20 in this example is shown as four rows of equipment racks 20a-20d each receiving 125 kW of electrical power. Of course, other types of loads may be powered by the system 10, as will be discussed further in the following paragraphs. Accordingly, the system 10 is not limited to use with only equipment rack mounted electrical computing components. The supply of power to the loads 20a-20d may be controlled through a plurality of circuit breakers 22 and 20a1/20a2, 20b1/20b2, 20c1/20c2, 20d1/20d2, the operation of which will be explained more fully in the following paragraphs.

The system 10 in this example also makes use of two power converters 26 and 28 which are coupled to each of the power supply sources 12-18, as well to the loads 20a-20d. By "power converter" it is meant a device that can function in the manner of a conventional uninterruptible power supply (UPS) that supports a load by drawing power from a battery or battery bank when utility power fails, but that has the additional capability of directing power from any power source to any load or to another power source to which it is connected. In this example the power converters 26 and 28 are configured in the well-known "redundant 1+1" configuration for even further improved reliability. A supplemental battery subsystem 30, in this example a bank of lithium ion batteries (hereinafter "power converter LIBs" 30) located remote from the power converters 26 and 28, is provided which may be coupled to either, or both, of the power converters 26 and 28 via selective closing of circuit breakers 32a and 32b located on a dedicated power bus 32c. The function of the power converter LIBs 30 is an important feature of the system 10 and will be explained in greater detail in the following paragraphs.

Coupling of the power converter 26 to the power sources 12-18 may be controlled by selective closing of circuit breakers 34a, 34b, and 34c, and to the load 20 via a circuit breaker 34d. Coupling of the power converter 28 to the power supply sources 12-18 is controlled by selective closing of the circuit breakers 36a and 36b, and to the load 20 by circuit breaker 36d. Power converter 26 includes a bypass circuit 26a, a rectifier subsystem 26b, a DC/DC converter 26c, a DC/AC inverter 26d and an electronic controller 26e. Power converter 28 likewise includes the same subsystems 28a-28e. The fuel cell subsystem 12 may include a fuel cell 12a, in this example a solid oxide fuel cell ("SOFC"), which receives natural gas from a gas utility 40. A DC/DC converter 12b converts the DC output from the fuel cell 12a to a DC output of different magnitude, which may then be fed by closing circuit breaker 12c and circuit breaker 34c to the power converter 26. The power converter 26 receives the DC power supplied from the fuel cell subsystem 12 at its inverter 26d and converts the DC power to AC power, which is then supplied to the load 20. The AC power may also be used by the DC/DC converter 26c of the power converter 26 to help recharge the power converter LIB 30. These operations are controlled by the electronic controller 26e. Advantageously, if the fuel cell subsystem 12 is producing more power than is required by the load 20, the excess power can be used to charge the power converter LIBs 30 and/or the extended run LIB 18a of the integrated battery power subsystem 18 (explained in greater detail in the following paragraphs), and if the power converter LIBs 30 and/or the extended run LIB 18a are adequately charged, the excess power can be delivered to the utility 14 or to an external generator port (not shown) of the electric generator 16a to help power other loads at the site. As a last resort when the fuel cell system 12 is producing excess power, a supplemental load (not shown) may be added to absorb excess power, or the fuel cell subsystem 12 output may be throttled back.

The utility power source 14 includes an electric utility 42 which can be used to supply AC power, in this example 415 Vac, to circuit breaker 14a and under voltage relay 14b, and to the bypass circuit 26a or 28a of either (or both) of the power converters 26 or 28, or alternatively to the rectifiers 26b or 28b (or both), depending on which of the circuit breakers 34a, 34b, 36a or 36b are selectively closed. While the under voltage relay 14b may not be needed in all applications, it is nevertheless helpful in sensing an under voltage (i.e., low voltage) condition existing at the output of the utility power source 14 and immediately opening the circuit breaker 14a and signaling the system 10 to switch to power from an alternate power source. In the example shown in the system 10, the alternate power source is the integrated battery power subsystem 18.

The generator subsystem 16 may receive natural gas from the gas utility 40 or it may use diesel fuel as its fuel source. For convenience, the following discussion will reference natural gas being used to power the generator subsystem 16. The generator subsystem 16 includes an electrical generator 16a which produces an AC output. The AC output in this example is 415 Vac, which may be supplied to the rectifiers 26b or 28b, or to the bypasses 26a or 28a, of the power converters 26 and 28 through circuit breaker 16b, or even to the load 20 via circuit breaker 16b and circuit breakers 36c and 22 and one or more of the circuit breakers 20a1/20a2, 20b1/20b2, 20c1/20c2 and 20d1/20d2.

The integrated battery power subsystem 18 may include a battery bank with an extended run LIB 18a having an associated inverter that converts the DC output of the extended run LIB 18a to an AC output, in this example a 415 Vac output. The AC output from the integrated battery power subsystem 18 may be applied through circuit breaker 18b to the rectifier 26b of the power converter 26, and/or to the rectifier 28b of power converter 28, or even directly to the load 20 via selective closing of the circuit breakers 36c and 22 and one or more of the circuit breakers 20a1/20a2, 20b1/20b2, 20c1/20c2 and 20d1/20d2.

Optionally, the output of the fuel cell subsystem 12 or the output of the integrated battery power subsystem 18 may be used to supply power to one or more auxiliary loads 44. This will involve, for example when using the fuel cell subsystem 12, selective closing of circuit breakers 12c, 34c, 34d, 46 and 48. For the case of the integrated battery power subsystem 18 this would involve selective closing of circuit breakers 18b, 36c, 48 and 46. Optionally, the fuel cell subsystem 12 or the integrated battery power subsystem 18 may also be used to supply AC power to one or more mechanical loads 50 through selective closing of circuit breaker 52. And of course, either one, or both, of the power converters 26 and 28 may drive the loads 44 and 50 as well, regardless of the power source that either one, or both, of the power converters 26 and 28 is/are being powered from.

As is understood in the industry, the utility breakers 12c, 14a. 16b and 18b are operated in a "break before make" fashion when switching between different power supply sources 12, 14, 16 and 18. A particular advantage of the system 10 is that the power converter LIB 30 can be used as a "bridge" to provide power to the power converter 26 or 28 while switching from one power source to another.

To coordinate overall operation and monitoring of the system 10, an orchestration electronic controller 54 having a smart power orchestration software module 54a (hereinafter simply "software module" 54a) may be included. The orchestration electronic controller 54 (hereinafter simply "controller" 54) receives inputs from an electronic controller 12d associated with the fuel cell subsystem 12, from an electronic controller 16c associated with the natural gas powered generator subsystem 16, and from an electronic controller 18c associated with the integrated battery power subsystem 18. The controller 54 is also in bi-directional communication with the electronic controller 26e of the power converter 26 and the electronic controller 28e of the power converter 28. The controller 54 and its software module 54a monitor overall operation of the power converters 26 and 28 using information received from the electronic controllers 26e and 28e. The controller 54 also uses information received from the electronic controllers 12d, 16c and 18c, in real time, to monitor which power supply source 12-18 is presently being used at any given time. Optionally, the controller 54 may also be in communication with a separate, remote controller (not shown) either through a wired or wireless connection to receive additional information or commands to help operate system 10.

The software module 54a may be constructed to help the system 10 carry out any desired hierarchical power source usage scheme. For example, the software module 54a may include one or more programs or submodules that control the system 10 to use power from the electric utility power supply source 14 if available, but if not, then the integrated battery power subsystem 18 if available, and if not, then the fuel cell subsystem 12 if available, and if not, then the natural gas generator subsystem 16. Virtually any hierarchical power use scheme may be employed, and the software module 54a can be readily modified or updated to accommodate other new power sources which are added at a later date. The software module 54a can also be updated to incorporate a modification to an existing hierarchical power usage scheme, should any one of the utility proxies be removed from the system 10. As described in the following paragraphs, the software module 54a may further be constructed to include programs or submodules that may perform functions such as demand management, energy cost optimization, and grid stabilization.

The power converter controllers 26e and 28e may also perform the functions of "qualifying" the power being received via any of the power supply sources 12-18, which involves monitoring frequency, voltage and/or current of the signal being received, and taking action to inform the controller 54 if power being received from the currently selected power source varies unacceptably in any way (e.g., unacceptable frequency variation, above a set upper voltage threshold, below a set lower voltage threshold, etc.). The controller 54 may use this information to command switching over, in real time, to a different power source, by selective closing and opening of the various circuit breakers used in the system 10.

An especially important advantage of the system 10 is the use of the power converter LIBs 30 to augment the AC power provided by any of the power supply sources 12, 14, 16 or 18. In particular, the use of the fuel cell subsystem 12, which has a "spongy" response to loads, meaning it cannot respond virtually instantaneously to the demands of the load, benefits significantly through the use of the power converter LIBs 30. The power converter LIB 30 can also be used to supply power from the power converter 26 through the breakers 32a, 34c and 12c to the DC/DC converter 12b of the fuel cell subsystem 12 to help "heat up" the fuel cell subsystem, during start-up of the fuel cell subsystem 12. The power converter LIBs 30 can be used to augment the output of the power converter 26 or 28, depending on which one of circuit breakers 32a or 32b is closed, when the power converter is receiving the output from the fuel cell subsystem 12, to better ensure a uniform output from the power converter(s) 26 and/or 28. Closing both circuit breakers 32a and 32b enables the power converter LIBs 30 to provide DC power to both power converters 26 and 28 simultaneously if both power converters are operating. Depending on the specific model/make of the integrated battery power subsystem 18 being used, this subsystem may also suffer from an unacceptably long response time and/or inability to rapidly respond to a demand from the load, and therefore also benefit from the use of the power converter LIBs 30.

Figure 2:
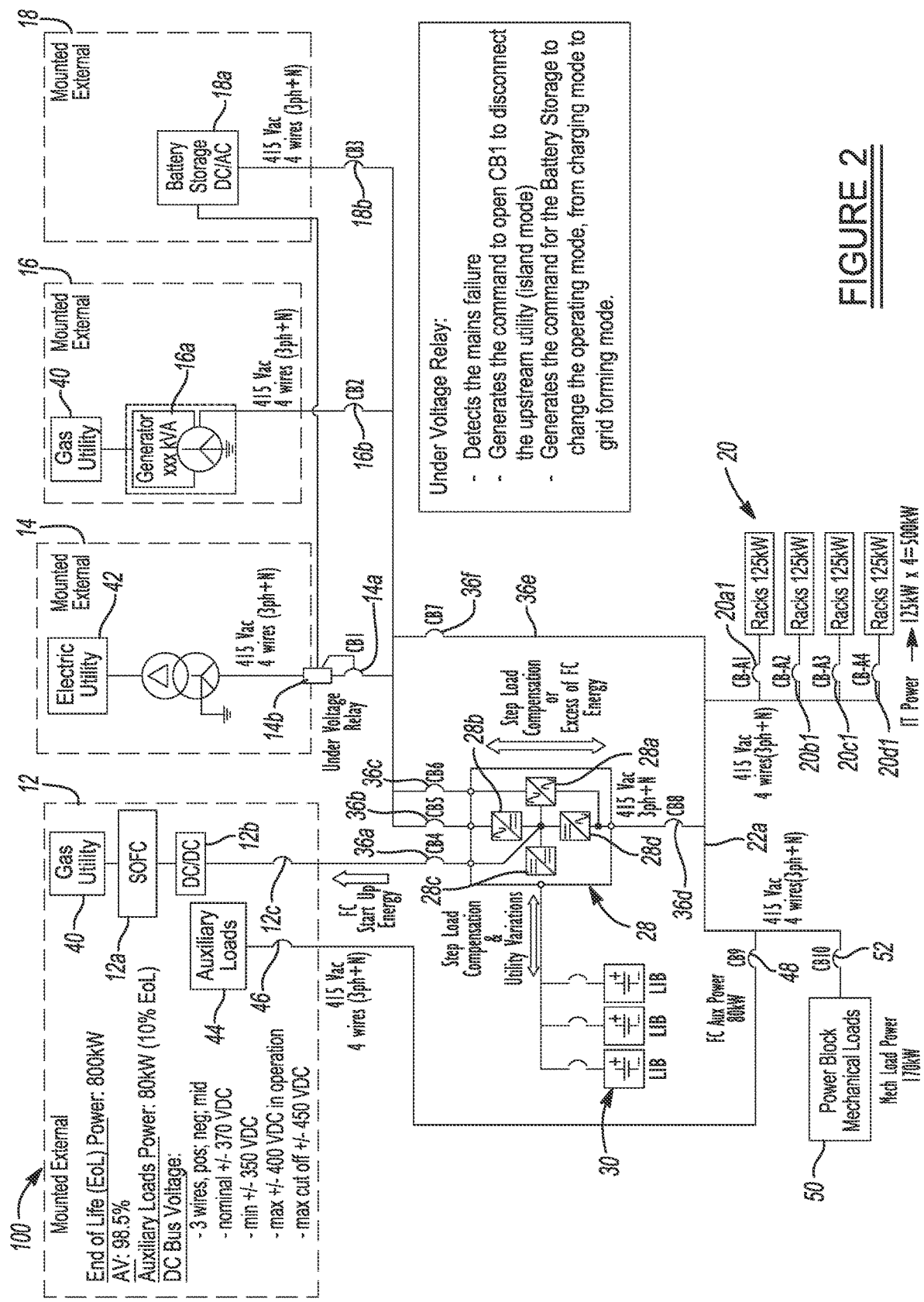
FIG. 2 is another embodiment of the present disclosure that illustrates "islanding" (i.e., isolating) of the integrated battery storage subsystem from the other power sources.

Referring to FIG. 2, a system 100 in accordance with another embodiment of the present disclosure is shown. Components in common with those of the system 10 are labelled with the same reference number of their corresponding component in system 10. To avoid cluttering the drawing the controllers 54, 26e, 28e, 12d, 16c and 18c have been omitted in FIG. 2, although it will be appreciated that these components may be present and perform the same operations as described for the system 10 of FIG. 1. To simplify the discussion of the system 100, only the power converter 28 is shown as part of the system, with it being understood that power converter 26 could easily be incorporated in the manner shown in FIG. 1.

The system 10 of FIG. 1 and the system 100 of FIG. 2 are each configured to "island" the integrated battery power subsystem 18. By "island" it is meant to isolate the integrated battery power subsystem 18 from the power supply sources 12-16. This eliminates any direct circuit path for the output from the integrated battery power subsystem 18 to flow directly into any of the power supply sources 12-16, while still providing a configuration that enables re-charging of the integrated battery power subsystem 18 when one of the other power supply sources 12, 14 or 16 becomes available for use. A configuration that "islands" the integrated battery power subsystem 18 may be recommended by the manufacturer of the subsystem. For example, certain integrated battery packs available from Tesla, Inc., which may be used with the systems 10 or 100 as the integrated battery power subsystem 18, are recommended to be islanded from all other available power sources.

The system 100 of FIG. 2 is less complex than system 10 of FIG. 1 and thus will be referred to throughout the following paragraph in order to provide a more convenient explanation of islanding. Islanding of the integrated battery power subsystem 18 (i.e., isolating from the electric utility power supply source 14 and the generator subsystem 16 via breakers 14a and 16b) still permits communication of an output side of the circuit breaker 18b directly with the load 20 and with the power converter 26. This is accomplished by tying the output side of the circuit breaker 18b to both a power bus portion 22a of the system through the circuit breaker 36f, and to the input sides of the bypass circuit 28a and the rectifier circuit 28b of the power converter 28 (through circuit breakers 36c and 36b, respectively).

In operation, when circuit breakers 18b and 36c are closed, and circuit breakers 14a, 16b, 36b and 36f are opened, the output of the integrated battery power subsystem 18 can be applied to the bypass circuit 28a of the power converter 28. When the circuit breakers 20a1/20b1/20c1/20d1 on the input side of the load 20 are closed, then AC power from the integrated battery power subsystem 18 will be directly applied to the power bus portion 22a and used to power the load 20. In this configuration there is no possibility of the integrated battery power subsystem 18 applying any portion of its output to any one of the power supply sources 12, 14 or 16. If needed to augment the output of the battery power subsystem 18, the power converter LIBs 30 can help by applying their output to the DC/DC converter 28c, which is converted to an AC output by the inverter 28d before being placed on the power bus portion 22a (through circuit breaker 36d).

In the event of a fault in the power converter 28, the integrated battery power subsystem 18 may still be used to directly power the load 20 by closing circuit breakers 18b and 36f, and opening circuit breakers 14a, 16b, 36b and 36c. In this configuration a maintenance line 36e is used to help create a direct path from the integrated battery power subsystem 18 to the power bus portion 22a, and thus to the load 20.

When recharging of the integrated battery power subsystem 18 is needed, circuit breaker 18b is closed, circuit breaker 36f is opened, and either one of circuit breakers 14a or 16b is closed. This enables power to be provided by either one of the power sources 14 or 16 to the battery integrated power subsystem 18 for re-charging, as well as simultaneously to either the rectifier circuit 28b or the bypass circuit 28a of the power converter 28, depending on which one of circuit breakers 36b and 36c is closed. Thus, re-charging can be accomplished simultaneously while the power source 14 or 16 is supplying power to the power converter 28.

FIGS. 3-5 provide examples of operations that may be performed by the system 10 when a power converter 26 or 28 is used with different power sources or combinations of power sources, i.e., utility power supply source 14 and/or utility proxy power supply sources 12, 16 and 18. FIG. 3 illustrates a table 200 showing various operations that may be performed by the system 10 when only power from the utility is present (i.e., power from utility power source 14) and at least one of the power converters 26 or 28 is present. In these operations, the power converter 26 or 28 functions as a conventional UPS when utility power is lost. FIG. 4 illustrates a table 300 showing operations that may be performed by the system 10 when the utility power supply source 14 is present along with the generator subsystem 16. FIG. 5 illustrates a table 400 showing operations that may be performed by the system 10 when the utility power supply source 14 and the integrated battery power subsystem 18 are both available, but the generator subsystem 16 is not. The "walk-in" process mentioned in the three scenarios of FIGS. 3-5 for switching over to a power source is a well-known process in the art by which electric power from the source being walked in is gradually applied to the load as power being supplied to the load from an alternate power source is gradually removed. The "soft loading" process also mentioned in FIGS. 3-5 is also a well-known process in the art by which power is gradually drawn from a source to support a load (or a load increase) at the same time as additional power required to support the load is supplied by an alternate power source.

Figure 6:
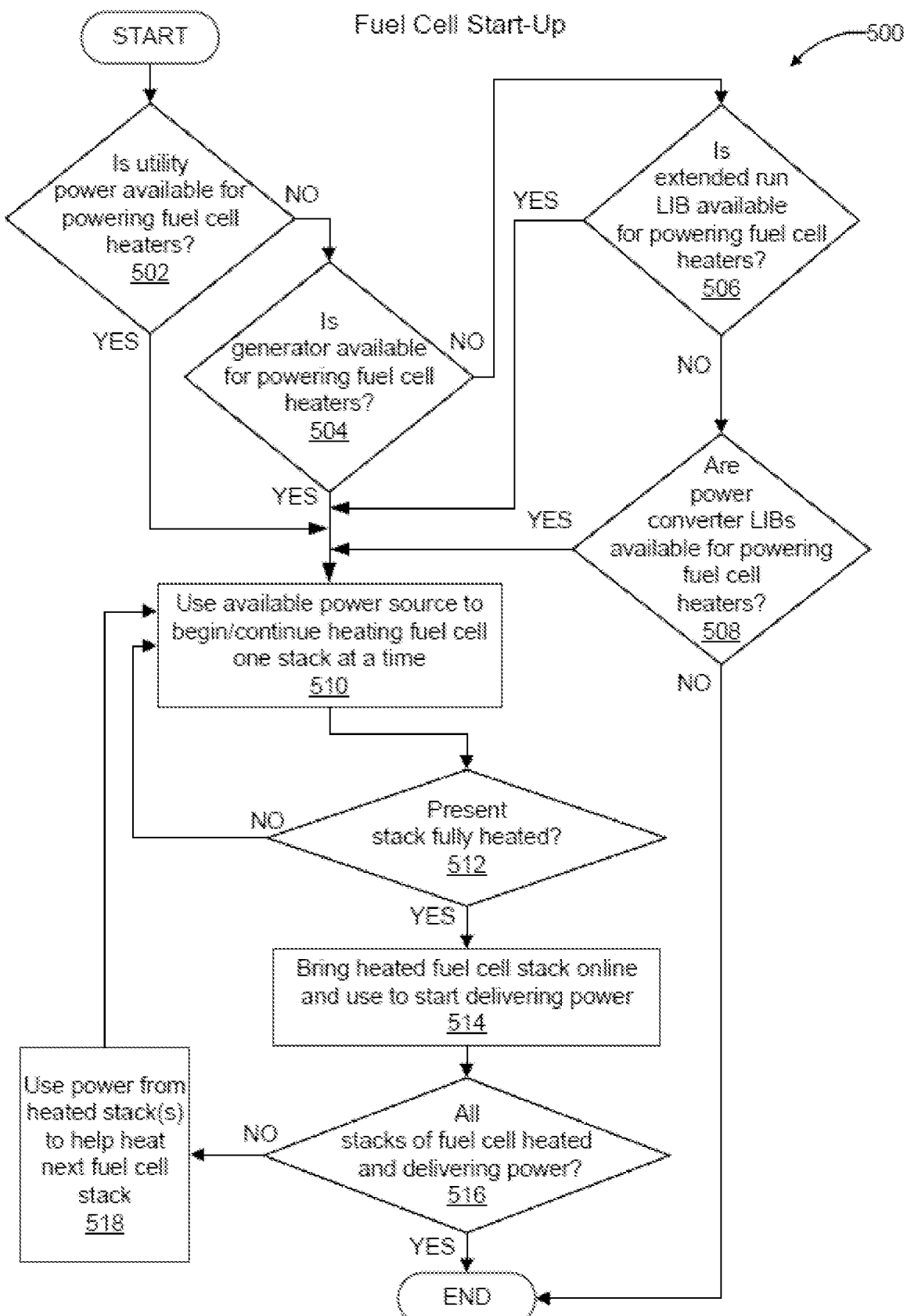
FIG. 6 is a flowchart showing one example of operations that may be performed by the system of FIG. 1 in managing start-up of a fuel cell that is incorporated into the system.

Referring now to FIG. 6, a flowchart 500 is shown to illustrate various operations that may be performed by the system 10 in starting up the fuel cell 12a of fuel cell subsystem 12. Initially at operations 502, 504, 506 and 508 checks are made, in this example in sequential fashion, to determine if utility power is available for powering the fuel cell heaters (operation 502), if a generator is available for powering the fuel cell heaters (operation 504), if an extended run LIB is available for powering the fuel cell heaters (operation 506), or if power converter LIBs are available for powering the fuel cell heaters (operation 508). The "priority" order of these four checks may be modified depending on design preferences, and this particular sequence of checks is therefore just meant to be one example of a suitable "priority" for using the various supplemental power sources that may be available. Also, fuel cells typically incorporate a plurality of stacks with separate heaters, which are brought on line one at a time, and this assumption will be made for this example.

Depending on which ones of the checks at operations 502-508 produces the first "Yes" answer, that particular power source will be used to begin (or to continue) heating of the fuel cell 12a one stack at a time, as indicated at operation 510. If utility power or generator power is present (i.e., operation 502 or operation 504 produces a "Yes" answer), then the power converter 26 or 28 applies DC voltage from its DC bus to the fuel cell heaters. If utility power and generator power are unavailable, then the power converter 26 or 28 applies DC voltage to the fuel cell heaters from the extended run LIB 18a (at operation 506) or from the power converter LIBs 30 (at operation 508) via its DC bus, but at a reduced power level. At operation 512 a check is made to determine if the particular stack presently being heated is fully heated, and if this check produces a "No" answer, then operations 510 and 512 are repeated. If the check at operation 512 returns a "Yes" answer, indicating that the stack being heated is fully heated, then that fuel cell stack is brought online and used to start delivering power, as indicated at operation 514. A check is then made at operation 516 if all of the stacks of the fuel cell 12a have been fully heated. If this check produces a "Yes" answer, then the fuel cell start-up operation successfully concludes. If operation 516 produces a "No" answer, then at operation 518 the stack that has just been fully heated, along with any previously fully heated stack(s), is/are used to begin heating the next stack and supporting the load. Operations 510-518 may be repeated until the check at operation 516 indicates all of the stacks are fully heated and delivering power.

If the check at operation 508 (the last of the four options for powering the fuel cell stack heaters) produces a "No" answer, then the fuel cell start-up procedure is suspended.

Figure 7:
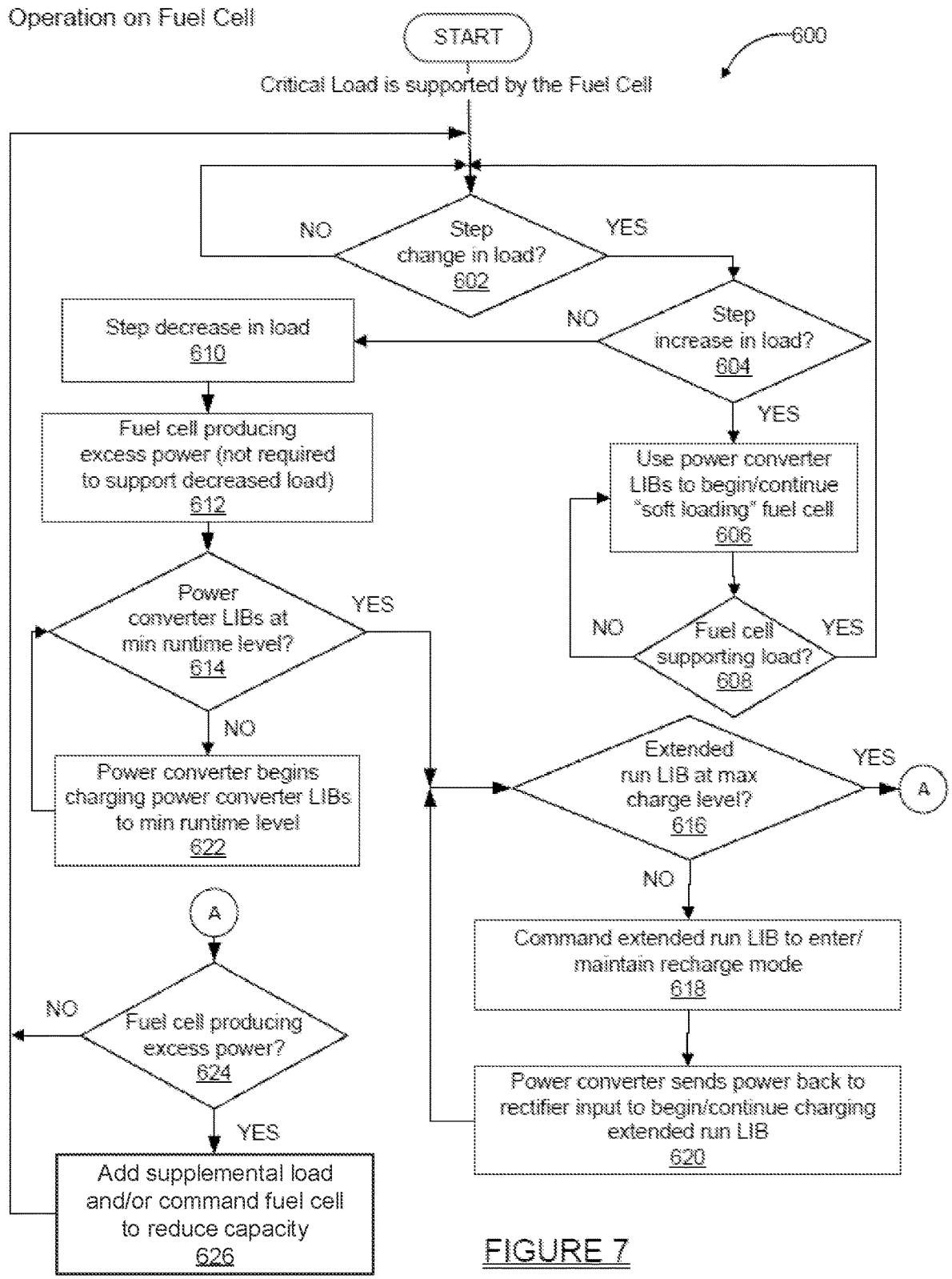
FIG. 7 is a flowchart showing one example of operations that may be performed by the system of FIG. 1 in handling both a step load increase and a step load decrease.

FIG. 7 shows a flowchart 600 illustrating one example of operations that may be performed by the system 10 to monitor for, detect and respond to changes in the load while using the fuel cell subsystem 12 to power the load. For this example it will be assumed that the critical load is being fully supported by the fuel cell subsystem 12 and the preferred mode of fuel cell operation is to remain at constant load. Further, it will be assumed that the extended run LIB 18a has been held at a partial recharge state, which may be a charge level less than its maximum capacity that may be preselected by the system designer. At operation 602 a check is made if a step change in the load has occurred. If this check produces a "No" answer, the system 10 repeats operation 602, continuously monitoring for and detecting load changes; this may be done at the sub-cycle level, for example, at approximately 3 kHz. If the check at operation 602 produces a "Yes" answer, then operation 604 determines if the load change is a step increase.

If the check at operation 604 produces a "Yes" answer, indicating that a step increase in the load has been experienced, then at operation 606 the power converter LIBs 30 may be used to begin/continue soft loading of the fuel cell subsystem 12. "Soft loading" in the present example means that additional energy required to support the load increase is supplied by the power converter LIBs 30 while energy is gradually drawn from the fuel cell subsystem 12. A check is then made at operation 608 to determine if the fuel cell subsystem 12 is fully supporting the load. If it is not, then the soft loading of the fuel cell subsystem 12 continues at operation 606. If this check produces a "Yes" answer, then operation 602 may be repeated as the system 10 continues monitoring for a load change.

If the check at operation 604 produces a "No" answer, indicating that a step decrease in the load has been detected (operation 610), then the fuel cell subsystem 12 is currently producing more power than is required to support the decreased load (operation 612). A series of operations may then be performed to use the excess power from the fuel cell subsystem 12 to recharge the power converter LIBs 30 and the extended run LIB 18a, if necessary. At operation 614 a check is made to determine if the charge level of the power converter LIBs 30 is at its minimum runtime level. By "minimum runtime level" it is meant the level of charge that is required to maintain the battery in operational condition for a time designated by the user. In one example the minimum runtime level may be 80% of maximum battery charge, although this level may be varied higher or lower by the system designer. If the check at operation 614 produces a "Yes" answer, then no recharging of the power converter LIBs 30 is necessary, and a check may be made at operation 616 to determine if the extended run LIB 18a is at its maximum charge level. The maximum charge level of the extended run LIB 18a may reflect system performance factors such as speed of fuel cell response, or may be preset to be 100% of capacity, 80% of capacity, or any other level selected by the system designer. If the check at operation 616 also produces a "Yes" answer, then no recharging of the extended run LIB 18a is needed, and at operation 624 the system 10 determines if the fuel cell subsystem 12 is still producing excess power. If so, at operation 626, a supplemental load may be added to keep the system 10 in balance, and if the critical load has not recovered, it may be necessary for the system 10 to command the fuel cell subsystem 12 to reduce its capacity. After operation 626, or if at operation 624 the fuel cell subsystem 12 is no longer producing excess power, the system 10 continues monitoring for a load change at operation 602.

If the check at operation 616 indicates that the extended run LIB 18a is not at its maximum charge level, then the system 10 may command the extended run LIB 18a to enter (or to maintain) a recharge mode of operation, as indicated at operation 618. Then at operation 620 the power converter 26 sends excess power available from the fuel cell subsystem 12 back to the rectifier input (i.e., the input side of rectifier subsystem 26b), to begin/continue charging the extended run LIB 18a. Operations 616-620 are repeated until at operation 616 the extended run LIB 18a is detected as being charged to its maximum charge level, at which point the check at operation 624 may be performed.

If the check at operation 614 produces a "No" answer, indicating that the power converter LIBs 30 are not charged to their minimum runtime charge level (in this example, 80% of maximum battery charge), then at operation 622 the power converter 26 begins charging the power converter LIBs using excess power from the fuel cell subsystem 12. Operations 614 and 622 are then repeated until the check at operation 614 produces a "Yes" answer, indicating that the power converter LIBs 30 are charged to their maximum predetermined charge level.

It will be appreciated, then, that setting and maintaining the charge levels of the power converter LIBs 30 and extended run LIB 18a at values less than 100% of capacity enables excess power from the fuel cell subsystem 12, which suddenly becomes available because of a step decrease in the load, to be "absorbed" or utilized by the power converter LIBs 30 and extended run LIB 18a for recharging purposes. Without this feature, the need would exist to immediately introduce a supplemental load, which would serve to immediately help absorb the excess power available from fuel cell subsystem 12, but without serving any other useful purpose. Setting and maintaining the charge level of the power converter LIBs 30 and extended run LIB 18a at something less than 100% thus serves two useful purposes: helping to provide a means by which the excess power may be absorbed, as well as using the excess power to recharge the power converter LIBs 30 and extended run LIB 18a.

Figure 8:
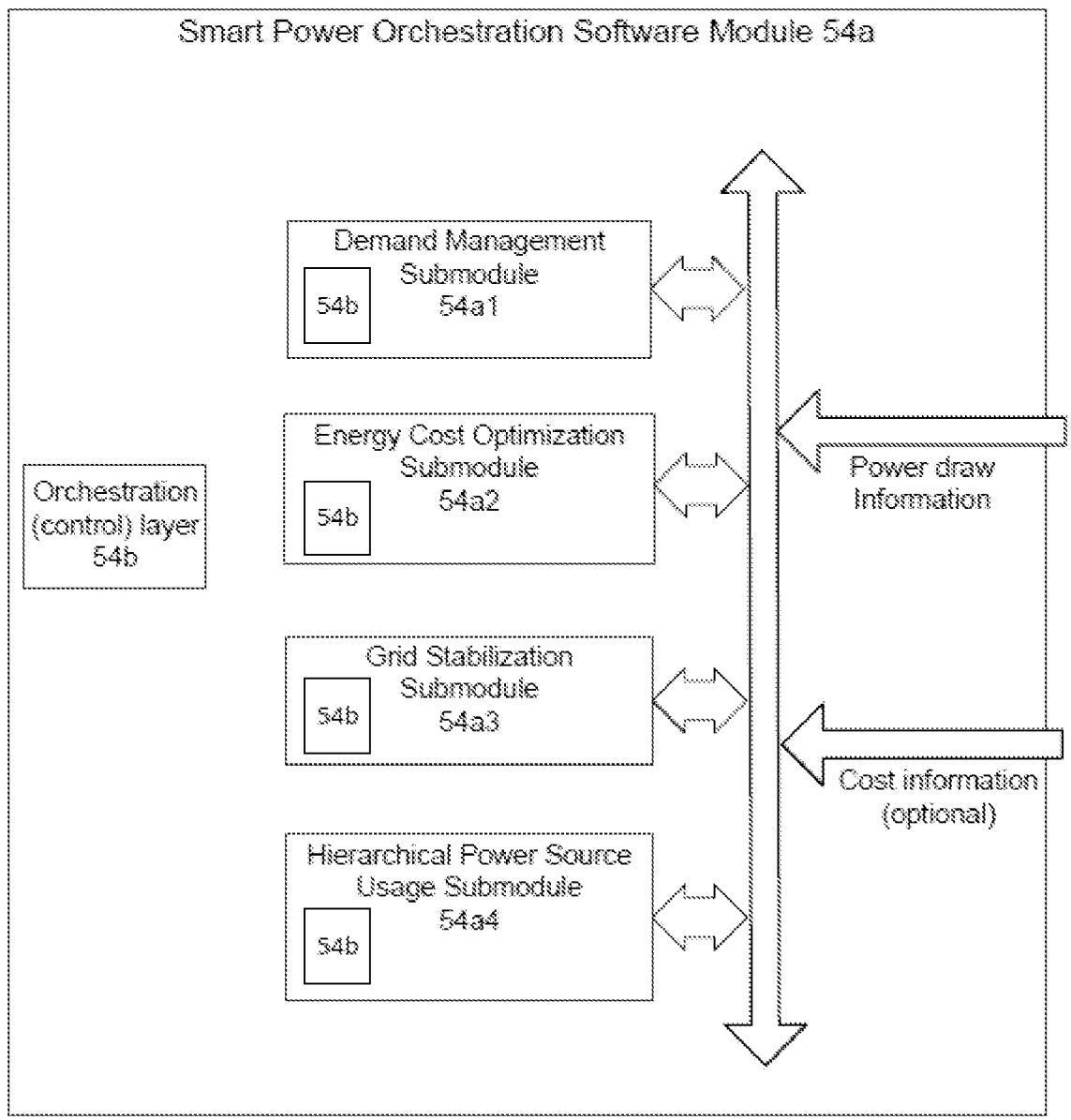
FIG. 8 is a high level block diagram of various submodules that may be included in the smart power optimization software module of the system of FIG. 1.

The smart power orchestration software module 54a is shown in greater detail in FIG. 8. The software module 54a helps to implement an intelligent control/utilization scheme by which the ultimate goal of the power converters (e.g., power converters 26 and 28) is to always deliver ITIC compliant power to the critical load. To this end, the software module 54a may control a number of programs or submodules. For example, a demand management submodule 54a1 may involve enforcing a preset limit on utility power draw, such as a limit in response to utility requirements, guidelines, or discount schedules. An "orchestration layer" 54b, acting as a control layer, uses external signals or internal predetermined settings to limit the amount of power drawn from the utility. The power converters 26 and 28 source-share between the utility and other available energy sources in the manner described above. For example, if the fuel cell subsystem 12a is available, the system 10 may draw energy from it, while in emergency situations the system 10 may draw from the power converter LIBs 30 and/or the extended run LIB 18a.

The software module 54a may also include an energy cost optimization submodule 54a2 to help determine which of two or more available energy sources, at any given time of day, is the lowest cost energy source. The energy cost optimization submodule 54a2 may be used to help select the lowest cost energy source, based in part on information provided by the orchestration layer 54b, such as from external signals or data, or possibly from saved settings or data which enable it to determine the real time cost of energy each of the available energy sources. It is expected that the lowest cost energy source will be desired to power the critical load in most scenarios, although the software module 54a could be configured to account for other unusual scenarios or conditions if, for some reason, the lowest cost energy source should not be used.

If the system 10 is grid tie enabled it may export energy if the cost of generated energy is lower than the recovered grid tie revenue. The system 10 preferably always keeps the power converter LIBs 30 charged to their minimum runtime limits. The system 10 may delay recharging the extended run LIB 30 as long its partial recharge state can be maintained. If the extended run LIB 30 is not at its maximum charge level, it may be recharged until it is (which as noted above may not be the 100% maximum charge value, but instead a lower value, for example, 80%).

The software module 54a may also include a grid stabilization submodule 54a3. The grid stabilization submodule 54a3 works with the orchestration layer 54b, and optionally with the energy cost optimization submodule 54a2, and further optionally with external signals providing either one or both of power draw and cost information, to determine how much grid stabilization energy is required. The power converters 26 and/or 28 may deliver to its/their respective limit(s) of available power using the energy cost optimization operation to provide the desired grid stabilization energy.

The software module 54a may also include a hierarchical power source usage submodule 54a4, which, as previously described, may determine the order in which utility proxies are used if the utility power supply becomes unavailable.

The various embodiments of the present disclosure all provide the ability to make use of two or more different utility proxies as power sources, in accordance with a predetermined hierarchy of use. The various embodiments of the present disclosure, in particular, overcome the drawbacks associated with using fuel cells and battery power subsystems as a primary power source. Such power sources are often not sufficiently responsive to real time changes in loads being powered, and the various embodiments of the present disclosure eliminate these drawbacks without significantly complicating the overall system design or significantly increasing its cost.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power supply management system adapted for use with at least one utility proxy power source, to help control powering a load when an AC mains power source is not available to provide power to the load, the system comprising:
   a power converter forming an uninterruptible power supply, the power converter including a power converter controller configured to control operation of the power converter;
   a supplemental battery subsystem in communication with the power converter for supplying DC power to the power converter;
   the power converter controller further configured to monitor the application of power from the utility proxy to the load, and to use the DC power supplied by the supplemental battery subsystem when needed to supplement the generation of power by the power converter, to thus assist in powering the load along with the power being provided by the utility proxy; and
   an orchestration controller configured to communicate with the at least one utility proxy and with the power converter controller, and to provide information concerning the at least one utility proxy to the power converter controller for use by the power converter controller in controlling operation of the power converter.

2. The system of claim 1, wherein the supplemental battery subsystem comprises at least one lithium ion battery cell.

3. The system of claim 1, wherein the supplemental battery subsystem comprises a bank of lithium ion battery cells.

4. The system of claim 2, wherein the at least one lithium ion battery cell is coupled via a dedicated power bus to the power converter.

5. The system of claim 3, wherein the bank of lithium ion battery cells is coupled via a dedicated power bus to the power converter.

6. The system of claim 2, further comprising a plurality of independently controllable circuit breakers for selectively coupling at least one of a plurality of available utility proxy sources, or the AC mains power source, to the power converter.

7. The system of claim 2, further comprising an additional power converter, representing an additional uninterruptible power source, in communication with both the supplemental battery subsystem and the power converter, for also assisting in providing power to the load.

8. The system of claim 1, wherein the power converter is configured to recharge the supplemental battery subsystem when excess power beyond what is required to power the load is available from at least one of the utility proxy or the AC mains power source.

9. The system of claim 1, wherein the supplemental battery subsystem is configured to be held in a state of partial charge, and further configured to absorb periodic levels of excess power produced by the utility proxy which is not required for powering the load.

10. The system of claim 1, wherein the controller of the power converter is configured to command that a supplemental load be connected to the load when the utility proxy is generating excess power beyond that required to power the load.

11. The system of claim 1, wherein the controller of the power converter is configured to implement a soft loading feature to gradually apply power being received from the utility proxy to the load, while the power converter is also applying power to the load.

12. The system of claim 1, wherein the orchestration controller is further configured to monitor operation of the controller of the power converter.

13. The system of claim 12, wherein the orchestration controller includes an orchestration software module having a submodule for carrying out a hierarchical power source usage scheme to help control the use of the utility proxy, and at least one additional utility proxy that is available to provide power to the load.

14. The system of claim 12, wherein the orchestration controller includes an orchestration software module having a demand management submodule, the demand management submodule configured to at least one of:
   enforce a preset limit on utility power being drawn from a power utility;
   enforce a limit in response to utility requirements set by a utility power source;
   enforce a utility guideline set by a utility power source; or
   enforce a limit in response to a utility discount schedule set by a utility power source.

15. The system of claim 13, wherein the orchestration software module includes an orchestration layer configured to act as a control layer and to use at least one of external signals or internal predetermined settings to limit the amount of power drawn from a utility power source.

16. The system of claim 15, wherein the orchestration software module includes an energy cost optimization submodule configured to help determine which of two or more available energy sources, at any given time of day, is the lowest cost energy source.

17. The system of claim 16, wherein the orchestration software module further includes a grid stabilization submodule configured to operate with the orchestration layer, and also with the energy cost optimization submodule and with external signals providing both power draw and cost information.

18. A power supply management system adapted for use with a plurality of available utility proxies, wherein the plurality of utility proxies includes a fuel cell utility proxy, to help control powering a load when an AC mains power source is not available to provide power to the load, the system comprising:
- a power converter forming an uninterruptible power supply, the power converter including an internal power converter controller configured to control operation of the power converter;
- a supplemental battery subsystem in communication with the power converter for supplying DC power to the power converter;
- the power converter controller further configured to monitor the application of power from the utility proxy to the load, and to use the DC power supplied by the supplemental battery subsystem when needed to supplement the generation of power by the power converter, to thus assist in powering the load along with the power being provided by the utility proxy; and
- the power converter controller further configured to monitor for step changes in load when the load is being supported by the fuel cell utility proxy, and to:
  - use the supplemental battery subsystem to provide power to the load when a step increase in demand from the load is detected; and
  - when a step decrease in demand from the load is detected, to use excess power to charge the supplemental battery subsystem; and
- an orchestration controller configured to communicate with the plurality of available utility proxies and with the power converter controller, and to provide information concerning the plurality of available utility proxies to the power converter controller for use by the power converter controller in controlling operation of the power converter.

19. The system of claim 18, wherein the power converter controller further is configured to carry out a pre-heating operation to preheat the fuel cell utility proxy, when initially starting the fuel utility cell, by using a different one of the available utility proxies to provide energy to heat fuel cell stacks of the fuel cell utility proxy, in a sequential manner, until all of the fuel stacks of the fuel cell utility proxy are fully heated and on-line delivering power.

20. A power supply management method for use with at least one utility proxy power source, to help control an application of power to a load when an AC mains power source is not available to provide power to the load, the method comprising:
- using a power converter forming an uninterruptible power supply to assist in providing power from the at least one utility proxy to the load;
- using a supplemental battery subsystem in communication with the power converter to supply DC power to the power converter; and
- controlling the power converter to use the DC power provided from the supplemental battery subsystem when needed to supplement the generation of power by the power converter, to thus assist the utility proxy in powering the load; and
- an orchestration controller configured to communicate with the at least one utility proxy and with the power converter controller, and to provide information concerning the at least one utility proxy to the power converter controller for use by the power converter controller in controlling operation of the power converter.

* * * * *